G. A. PATTBERG.
RODENT TRAP.
APPLICATION FILED SEPT. 28, 1920.
1,432,356. Patented Oct. 17, 1922.
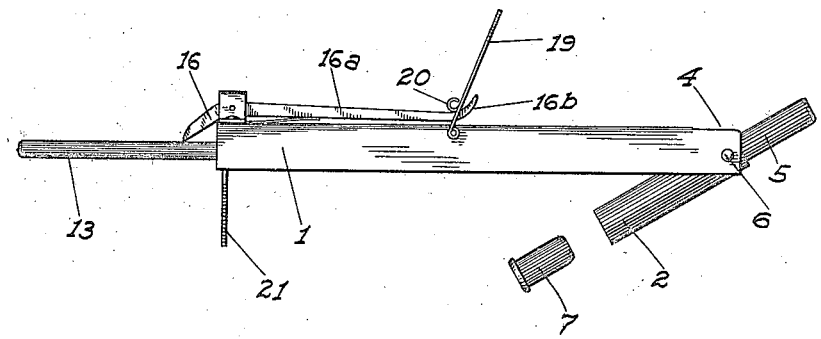
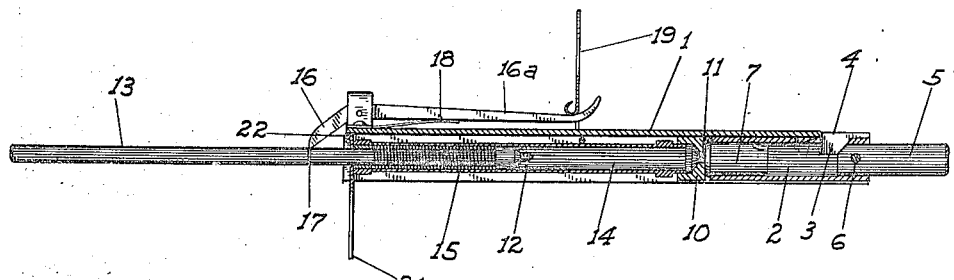
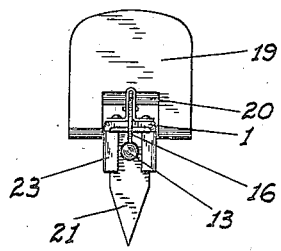
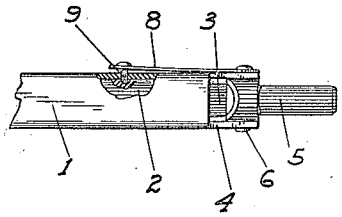
INVENTOR.
George A. Pattberg
BY
ATTORNEY Patented Oct. 17, 1922.

1,432,356

UNITED STATES PATENT OFFICE.

GEORGE A. PATTBERG, OF SAN LEANDRO, CALIFORNIA, ASSIGNOR OF TWENTY-FIVE PER CENT TO JOSEPH A. AVELLAR, OF SAN LEANDRO, CALIFORNIA.

RODENT TRAP.

Application filed September 28, 1920. Serial No. 413,449.

*To all whom it may concern:*

Be it known that I, GEORGE A. PATTBERG, a citizen of the United States, residing at San Leandro, county of Alameda, State of California, have invented certain new and useful Improvements in Rodent Traps; and I do declare the following to be a full, clear, and exact description of the same, reference being had to the accompanying drawings, and to the characters of reference marked thereon, which form a part of this application.

This invention relates to improvements in rodent traps, being of a type especially adapted for the extermination of gophers, ground squirrels and the like, the principal object being to provide a device of this character intended to be placed in the hole made by the animal, and so arranged that but light contact with a certain member of the device will insure the death of the animal.

This apparatus combines the features of a trap and a gun, and is more positive in its killing action than the ordinary jaw trap, which sometimes only wounds or merely holds the animal, making it necessary for the party, in whose ground the rodent is operating, to remove and kill the same after it is caught.

My device however has no trap-jaw as commonly provided, the killing being done by the concussion caused by the explosion of a cartridge, the latter being fired by the animal.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side elevation of the device, showing the same in un-set and loading position.

Fig. 2 is a longitudinal section, showing the device loaded and set.

Fig. 3 is a rear end elevation of the same.

Fig. 4 is a fragmentary top plan view of the firing end of the device.

Referring now more particularly to the characters of reference on the drawings, the numeral 1 denotes a barrel, preferably rectangular and open along its under side. In one end is pivotally mounted a tubular cartridge chamber 2 having an opening 3 in its upper side arranged to register with a similar opening 4 in the barrel.

Beyond the opening, the chamber is plugged as at 5, through which plug the pivotal pin 6 passes. The inner end of the chamber is open to receive a blank cartridge 7 (preferably a 38 size), this cartridge being inserted when the chamber is turned on its pivot 6 to project below the barrel. The chamber is maintained in position in the barrel by means of a spring 8 fixed to the latter and having a pin 9 on one end thereof adapted to seat in a recess provided in the chamber.

Fixed in the barrel adjacent the cartridge end of the chamber 2 is a block 10, substantially a breech-block, having an orifice 11 adapted to receive a firing pin 12 therein, this firing pin being formed with a rod 13 slidably mounted in a removable tube 14 fitted in the barrel and projecting therebeyond, there being a coil spring 15 around the rod in the barrel and tending to force the rod and firing pin thereon toward the block 10.

Pivotally mounted on the barrel at the forward end thereof is a trigger 16 one end of which is adapted to engage a circumferential notch 17 cut in the rod 13 when the latter has been pulled out a predetermined distance against the pressure of the spring. A spring 18 co-operating with the trigger acts to normally hold the same in contact with the rod.

Pivotally mounted to the barrel and extending transversely thereof above the same is a trigger-actuating plate 19 under which the other end 16$^a$ of the trigger 16 passes, said plate having a curled-up portion 20 on the forward side thereof to provide a good bearing surface and to off set such point of contact forward of the plate, so as to give a quicker trip, and the end of the trigger beyond the plate being bent up as at 16$^b$ so that the plate 19 cannot drop back. This also insures that the trigger will be actuated with a movement of the plate in either direction. At the forward end of the barrel is a downwardly projecting spike 21.

In order to readily remove the tube 14 from the barrel when desired, the same is made to fit easily at one end into the block 10, and is free to have limited sliding movement therein. On the outer end the spike 21 is fixed, this being in reality a transversely positioned plate slidable between the side walls of the barrel, the upper edge being bent rearward as at 22 and seating between the top wall of the barrel and ears 23 formed therewith and bent inwardly in front of the member 21.

By pressing the tube into the block 10 so that the spike-plate clears the ears, it may be moved away from the barrel at that end, and then pulled clear of the block. To operate the device, a blank cartridge is inserted into the chamber 2, and the latter then snapped into position in the barrel. The rod 13 is then drawn out until the trigger engages the notch 17, and the plate 19 raised into position. The device is then inserted into the gopher or squirrel hole, with the cartridge end pointing inwardly, the spike being pressed into the ground so that the device cannot be readily shifted.

It is a well known fact that gophers and the like always close their holes up sooner or later, especially when disturbed. As soon however as the animal seeks to do this, he must first pass the plate 19, which is relatively wide, being intended to fill most of the area of an ordinary gopher or squirrel hole.

On touching the plate however, the trigger is actuated, releasing the rod 13 and causing the firing pin to contact with the cartridge, discharging the same. The latter being blank, the end plug 5 is not harmed, but the force of the explosion discharges through the openings 3 and 4, practically tearing to pieces the animal thereabove, the position of the plate relative to the discharge openings being such that the force of the explosion will act on a rodent of average size just behind the forelegs, while a smaller one would probably be disemboweled.

It will be noted from this description that the trap mechanism is entirely enclosed and cannot be fouled, so that once the trigger is set and the device in position, a gopher, ground squirrel or other rodent is positively doomed on coming in contact with the trigger.

From the foregoing description it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. A device of the kind described including a barrel arranged to receive a cartridge, a spring-pulled rod projecting from one end of the barrel and having a firing pin on its inner end, said rod having an annular groove outside the barrel when the spring is under tension, a trigger pivoted on the barrel adjacent the rod-projecting end thereof, a portion of said trigger extending along the barrel while the other end beyond the pivot is bent toward the rod and sharpened to engage the groove therein, spring means for holding the last named portion of the trigger in engagement with the rod and the first named portion away from the barrel, and a plate pivoted onto the barrel transversely of the trigger adjacent the free end thereof and arranged to depress said end when the plate is moved in either direction, whereby the opposite end of the trigger will be raised from the rod and the latter released.

2. A device of the kind described including a barrel provided with an orifice on its upper side at one end, a cartridge chamber pivoted to the barrel at that end and adapted to be swung downwardly, to receive a cartridge therein at its inner end, a breech block fixed in the barrel and being adjacent the cartridge-rim when the chamber is swung into operative position, means for holding the chamber in that position a firing pin in the barrel adapted to project through the block to engage the cartridge, and trigger means for holding and releasing the pin.

3. A device of the kind described comprising a barrel open along the bottom, a cartridge chamber mounted at one end thereof, a firing pin, a rod formed with said pin, a spring about the rod acting to force the pin toward the cartridge chamber, a tubular housing in the barrel for said spring and forming a bearing for the rod, a breech block fixed in the barrel between the housing and the cartridge chamber and through which the firing pin is adapted to project, the breech block being recessed to provide a seat for the adjacent end of the housing whereby to positively center the firing pin relative to the block, and the housing being removably mounted at its opposite end in the barrel.

In testimony whereof I affix my signature.

GEORGE A. PATTBERG.